(12) United States Patent
Ferren (10) Patent No.: US 10,133,482 B2
(45) Date of Patent: Nov. 20, 2018

(54) ADAPTIVE VIRTUAL KEYBOARD FOR HANDHELD DEVICE

(71) Applicant: Intel Corporation, Santa Clara, CA (US)

(72) Inventor: Bran Ferren, Beverly Hills, CA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 15/396,603

(22) Filed: Dec. 31, 2016

(65) Prior Publication Data

US 2017/0235482 A1    Aug. 17, 2017

Related U.S. Application Data

(60) Continuation of application No. 14/951,401, filed on Nov. 24, 2015, now Pat. No. 9,851,897, which is a
(Continued)

(51) Int. Cl.
*G06F 3/0488* (2013.01)
*G06F 9/451* (2018.01)
(Continued)

(52) U.S. Cl.
CPC ....... *G06F 3/04886* (2013.01); *G02B 13/009* (2013.01); *G02B 13/0065* (2013.01); *G03B 3/00* (2013.01); *G06F 3/02* (2013.01); *G06F 3/0236* (2013.01); *G06F 3/0237* (2013.01); *G06F 3/041* (2013.01); *G06F 3/0412* (2013.01); *G06F 3/0414* (2013.01); *G06F 3/0416* (2013.01);
(Continued)

(58) Field of Classification Search
None
See application file for complete search history.

(56) References Cited

U.S. PATENT DOCUMENTS 6,259,436 B1    7/2001  Moon et al.
9,195,818 B2   11/2015  Ferren
(Continued)

FOREIGN PATENT DOCUMENTS

CN    1095498 A    11/1994
CN    1331815 A     1/2002
(Continued)

OTHER PUBLICATIONS

Extended European Search Report received for European Patent Application No. 09846310.2, dated Oct. 8, 2012, 10 pages.
(Continued)

*Primary Examiner* — Kenneth B Lee, Jr.
(74) *Attorney, Agent, or Firm* — Law Office of R. Alan Burnett, P.S (57) ABSTRACT

In various embodiments, the size, shape, and arrangement of keys on a virtual keyboard may be determined based on touchscreen contacts made by the user. Further, the actual contact patch made by the user may be analyzed to interpret which point of contact was intended, and other factors such as spelling and context may also be considered. These factors may be determined based on a calibration session and/or on continuing inputs during operation of the keyboard, and applied to future operational interpretations of the touchscreen contacts.

22 Claims, 5 Drawing Sheets

Related U.S. Application Data continuation of application No. 14/276,661, filed on May 13, 2014, now Pat. No. 9,195,818, which is a division of application No. 13/376,620, filed as application No. PCT/US2009/069931 on Dec. 31, 2009, now Pat. No. 9,013,423.

(60) Provisional application No. 61/187,520, filed on Jun. 16, 2009.

(51) Int. Cl.

| | | |
|---|---|---|
| *H04N 13/243* | (2018.01) | |
| *G02B 13/00* | (2006.01) | |
| *G03B 3/00* | (2006.01) | |
| *G06F 3/041* | (2006.01) | |
| *G06F 3/0484* | (2013.01) | |
| *G06F 21/32* | (2013.01) | |
| *G06K 7/10* | (2006.01) | |
| *G06Q 30/02* | (2012.01) | |
| *H04N 5/232* | (2006.01) | |
| *G06F 3/02* | (2006.01) | |
| *G06F 3/023* | (2006.01) | |
| *G06K 9/00* | (2006.01) | |
| *H04N 7/18* | (2006.01) | |
| *G06Q 20/40* | (2012.01) | |
| *H04L 29/06* | (2006.01) | |
| *H04N 5/225* | (2006.01) | |
| *H04N 13/239* | (2018.01) | |
| *H04M 1/725* | (2006.01) | |

(52) U.S. Cl.
CPC .......... *G06F 3/0418* (2013.01); *G06F 3/0488* (2013.01); *G06F 3/04842* (2013.01); *G06F 3/04883* (2013.01); *G06F 9/451* (2018.02); *G06F 21/32* (2013.01); *G06K 7/10811* (2013.01); *G06K 9/00221* (2013.01); *G06K 9/00248* (2013.01); *G06K 9/00335* (2013.01); *G06K 9/00604* (2013.01); *G06K 9/00906* (2013.01); *G06Q 20/4012* (2013.01); *G06Q 20/40145* (2013.01); *G06Q 30/02* (2013.01); *H04L 63/083* (2013.01); *H04N 5/2258* (2013.01); *H04N 5/232* (2013.01); *H04N 5/23296* (2013.01); *H04N 7/183* (2013.01); *H04N 13/239* (2018.05); *H04N 13/243* (2018.05); *G06K 2207/1011* (2013.01); *H04M 1/72563* (2013.01); *H04M 2250/52* (2013.01)

(56) References Cited

U.S. PATENT DOCUMENTS

| | | | |
|---|---|---|---|
| 9,606,634 B2 * | 3/2017 | Assadollahi | .......... G06F 3/0237 |
| 2004/0136564 A1 | 7/2004 | Roeber et al. | |
| 2004/0183833 A1 | 9/2004 | Chua | |
| 2005/0140661 A1 | 6/2005 | Collins | |
| 2006/0066590 A1 | 3/2006 | Ozawa et al. | |
| 2006/0085757 A1 * | 4/2006 | Andre | ..................... G06F 3/041 |
| | | | 715/771 |
| 2006/0161846 A1 | 7/2006 | Van Leeuwen | |
| 2007/0152978 A1 | 7/2007 | Kocienda et al. | |
| 2007/0247442 A1 | 10/2007 | Andre et al. | |
| 2008/0030880 A1 | 2/2008 | Takahashi | |
| 2008/0100586 A1 | 5/2008 | Smart | |
| 2009/0009650 A1 | 1/2009 | Liu et al. | |
| 2009/0047995 A1 | 2/2009 | Futter et al. | |
| 2009/0109187 A1 | 4/2009 | Noma | |
| 2009/0146957 A1 | 6/2009 | Lee et al. | |
| 2009/0160792 A1 | 6/2009 | Morohoshi et al. | |
| 2011/0084931 A1 | 4/2011 | Chang et al. | |
| 2011/0285555 A1 | 11/2011 | Bocirnea | |
| 2012/0146912 A1 | 6/2012 | Chen et al. | |
| 2012/0162078 A1 | 6/2012 | Ferren et al. | |
| 2012/0166995 A1 | 6/2012 | McAleer | |
| 2013/0105239 A1 | 5/2013 | Fung | |

FOREIGN PATENT DOCUMENTS

| | | |
|---|---|---|
| CN | 1653411 A | 8/2005 |
| CN | 1685301 A | 10/2005 |
| CN | 1717648 A | 1/2006 |
| CN | 1759369 A | 4/2006 |
| CN | 101263448 A | 9/2008 |
| EP | 0555034 A2 | 8/1993 |
| EP | 0609021 A2 | 8/1994 |
| EP | 0618528 A1 | 10/1994 |
| EP | 2042972 A1 | 4/2009 |
| EP | 2101250 A1 | 9/2009 |
| JP | 4-102911 A | 4/1992 |
| JP | 5-165569 A | 7/1993 |
| JP | 5-28115 A | 10/1993 |
| JP | 10-232735 A | 9/1998 |
| JP | 10-275046 A | 10/1998 |
| JP | 2000-194507 A | 7/2000 |
| JP | 2003-288172 A | 10/2003 |
| JP | 2004-341813 A | 12/2004 |
| JP | 2006-127488 A | 5/2006 |
| JP | 2006-520024 A | 8/2006 |
| JP | 2006-268313 A | 10/2006 |
| JP | 2007-274136 A | 10/2007 |
| JP | 2008-027183 A | 2/2008 |
| JP | 2008-192012 A | 8/2008 |
| JP | 2008-242958 A | 10/2008 |
| JP | 2009-509234 A | 3/2009 |
| JP | 2009-75778 A | 4/2009 |
| JP | 2009-110286 A | 5/2009 |
| JP | 2009-522697 A | 6/2009 |
| KR | 10-2006-0026830 A | 3/2006 |
| KR | 10-0837283 B1 | 6/2008 |
| KR | 10-0852401 B1 | 8/2008 |
| KR | 10-2008-0087590 A | 10/2008 |
| KR | 10-2009-0057304 A | 6/2009 |
| KR | 10-2009-0060888 A | 6/2009 |
| WO | 2004/051392 A2 | 6/2004 |
| WO | 2004/086181 A2 | 10/2004 |
| WO | 2008/030880 A1 | 3/2008 |
| WO | 2009/033350 A1 | 3/2009 |
| WO | 2010/147611 A1 | 12/2010 |

OTHER PUBLICATIONS

Office Action received for Korean Patent Application No. 10-2011-7026404, dated Apr. 30, 2013, 9 pages of Korean Office Action including 4 pages of English Translation.

Office Action received for Korean Patent Application No. 10-2011-7028292, dated Apr. 30, 2013, 9 pages of Korean Office Action including 4 pages of English Translation.

Office Action received for Korean Patent Application No. 10-2011-7028293, dated Apr. 30, 2013, 8 pages of Korean Office Action including 4 pages of English Translation.

Extended European Search Report received for European Patent Application No. 11192594.7, dated Apr. 12, 2012, 8 pages.

Office Action received for European Patent Application No. 11192594.7, dated Dec. 18, 2014, 6 pages.

Extended European Search Report received for European Patent Application No. 11192624.2, dated Feb. 20, 2012, 6 pages.

Extended European Search Report received for European Patent Application No. 12192526.7, dated Jan. 4, 2013, 9 pages.

Notice of Allowance received for Chinese Patent Application No. 200980159072.8, dated Aug. 15, 2014, 4 pages of Chinese Notice of Allowance including 2 pages of English Translation.

Office Action received for Chinese Patent Application No. 200980159072.8, dated May 5, 2014, 7 pages of Chinese Office Action including 4 pages of English Translation.

Office Action received for Chinese Patent Application No. 200980159072.8, dated Sep. 29, 2013, 16 pages of Chinese Office Action including 10 pages of English Translation.

(56) References Cited

OTHER PUBLICATIONS

Examination Report received for Singapore Patent Application No. 201107955-5, dated Oct. 4, 2013, 7 pages.
Written Opinion received for Singapore Patent Application No. 201107955-5, dated Feb. 14, 2013, 8 pages.
Examination Report received for Singapore Patent Application No. 201108849-9, dated Feb. 28, 2014, 4 pages.
Written Opinion received for Singapore Patent Application No. 201108849-9, dated Aug. 23, 2013, 9 pages.
Examination Report received for Singapore Patent Application No. 201108850-7, dated May 23, 2014, 5 pages.
Written Opinion received for Singapore Patent Application No. 201108850-7, dated Aug. 23, 2013, 9 pages.
Notice of Allowance received for Japanese Patent Application No. 2011-256591, dated Apr. 1, 2014, 2 pages of Japanese Notice of Allowance Only.
Office Action received for Japanese Patent Application No. 2011-256591, dated Apr. 30, 2013, 5 pages of Japanese Office Action including 3 pages of English translation.
Office Action received for Japanese Patent Application No. 2011-256591, dated Dec. 3, 2013, 2 pages of Japanese Office Action including 1 page of English translation.
Office Action received for Japanese Patent Application No. 2011-256592, dated May 14, 2013, 5 pages of Japanese Office Action including 3 pages of English translation.
Notice of Allowance received for Chinese Patent Application No. 201210009517.8, dated Mar. 4, 2016, 5 pages of Chinese Notice of Allowance including 3 pages of English Translation.
Office Action and Search Report received for Chinese Patent Application No. 201210009517.8, dated Jun. 3, 2014, 18 pages of Chinese Office Action including 11 pages of English Translation.
Office Action received for Chinese Patent Application No. 201210009517.8, dated Feb. 17, 2015, 7 pages of Chinese Office Action including 4 pages of English Translation.
Office Action received for Chinese Patent Application No. 201210009517.8, dated Jun. 19, 2015, 7 pages of Chinese Office Action including 4 pages of English Translation.
Office Action received for Chinese Patent Application No. 201210009517.8, dated Oct. 30, 2015, 7 pages of Chinese Office Action including 4 pages of English Translation.
Notice of Allowance received for Chinese Patent Application No. 201210009518.2, dated Apr. 30, 2015, 5 pages of Chinese Notice of Allowance including 3 pages of English Translation.
Office Action and Search Report received for Chinese Patent Application No. 201210009518.2, dated Apr. 16, 2014, 23 pages of Chinese Office Action including 15 pages of English Translation.
Office Action received for Chinese Patent Application No. 201210009518.2, dated Dec. 29, 2014, 9 pages of Chinese Office Action including 6 pages of English Translation.
Notice of Allowance received for Japanese Patent Application No. 2012-513031, dated Apr. 1, 2014, 2 pages of Japanese Notice of Allowance Only.
Office Action received for Japanese Patent Application No. 2012-513031, dated May 14, 2013, 5 pages of Japanese Office Action including 3 pages of English Translation.
Office Action received for Japanese Patent Application No. 2012-513031, dated Nov. 26, 2013, 4 pages of Japanese Office Action including 2 pages of English Translation.
Extended European Search Report received for European Patent Application No. 11192620.0, dated Apr. 12, 2012, 9 pages.
International Preliminary Report on Patentability and Written Opinion received for PCT Patent Application No. PCT/US2009/069931, dated Dec. 29, 2011, 8 pages.
International Search Report and Written Opinion received for PCT Patent Application No. PCT/US2009/069931, dated Oct. 13, 2010, 12 pages.
Extended European Search report received for European Patent Application No. 17152708.8, dated Apr. 24, 2017, 12 pages.

* cited by examiner

ADAPTIVE VIRTUAL KEYBOARD FOR HANDHELD DEVICE

BACKGROUND

This application is a continuation of U.S. patent application Ser. No. 14/951,401 filed Nov. 24, 2015, which is a continuation of U.S. patent application Ser. No. 14/276,661 filed May 13, 2014, now U.S. Pat. No. 9,195,818 issued Nov. 24, 2015; which is a divisional of U.S. patent application Ser. No. 13/376,620 filed Dec. 7, 2011, now U.S. Pat. No. 9,013,423 issued Apr. 21, 2015; which is a U.S. national phase of International Patent Application No. PCT/US2009/069931 filed Dec. 31, 2009; which claims priority from U.S. Provisional Patent Application No. 61/187,520 filed Jun. 16, 2009, which applications are incorporated herein by reference in their entireties.

BACKGROUND

As multi-purpose wireless devices become too small for standard mechanical/electronic keyboards, virtual keyboards are increasing being used as a primary input device by displaying an arrangement of keys on a touchscreen. The user enters a keystroke by simply touching the screen with a fingertip at the location where the desired key is displayed. Because of the small size and hand-held nature of these devices, many users typically use only their thumbs to enter the data. However, most of these virtual keyboards arrange the keys in either a rectangular matrix of keys, or in the standard QWERTY format. The linear nature of the rows in such arrangements makes them ill suited for used by the thumbs. Specifically, to move his thumb along the length of a row of keys or along the height of a column of keys, a user must articulate the several joints of his thumb in a relatively unnatural manner. Indeed, becoming accustomed to such arrangements can require extensive proprioceptive development from the user. While the designs of some physical keyboards on multi-purpose wireless devices do provide improved ergonomics (compared to a rectangular matrix of keys), the degree of to which the ergonomics can be tailored to a particular individual remains limited. Further, such designs do not account for the fact different users have different sizes of hands, fingers and thumbs, so a keyboard that is properly sized for one user may be more difficult for another user.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

Various embodiments of the invention relate to a configuration of virtual keys on the touch-screen of a virtual keyboard. Rather than being arranged in straight horizontal rows, the keys may be arranged in arcs that are conveniently reached by the user's thumb(s) when the device is held in the user's hand(s). In some embodiments, the placement of the keys may be customized to fit the individual user's thumb and/or personal preferences. In some embodiments, adaptive sensing may be used to compensate for the contact surface of the user's thumb being off-center from a key and/or being larger than the key.

Figure 1:
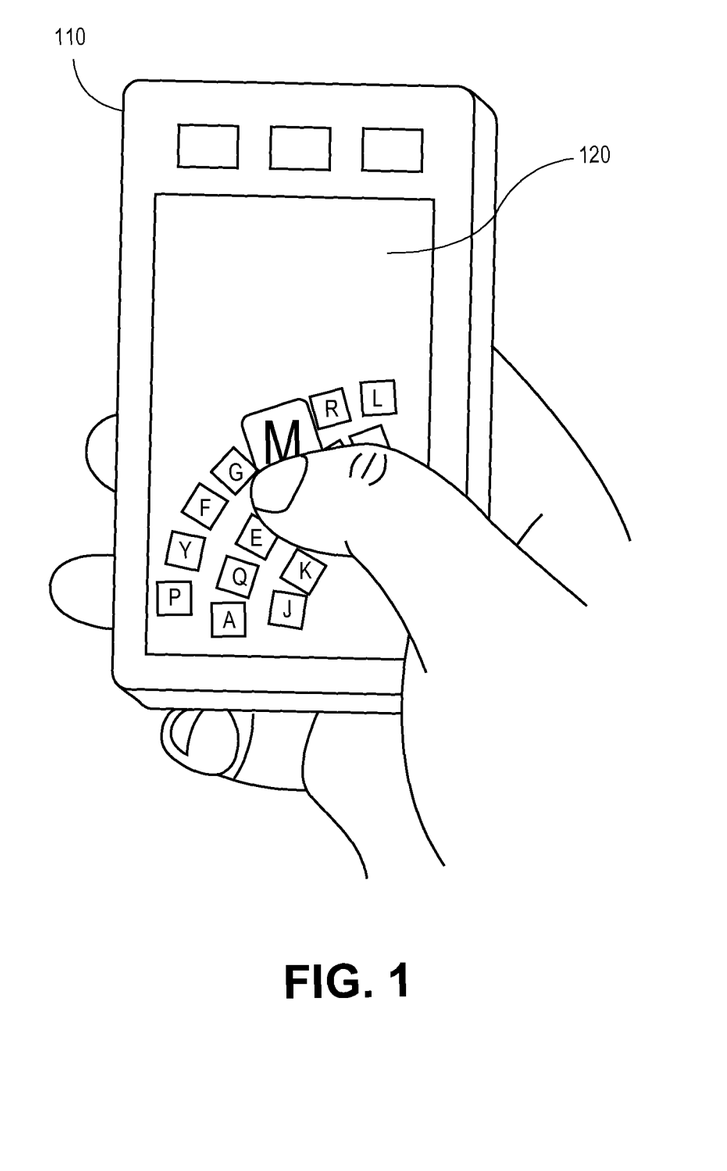
FIG. 1 shows a multi-function handheld user device, according to an embodiment of the invention.

FIG. 1 shows a multi-function handheld user device, according to an embodiment of the invention. The illustrated device 110 is shown with a touchscreen 120 for displaying information to the user and receiving tactile inputs from the user when the user touches the screen at one or more particular locations. Three hard buttons are also shown above the display. Other physical buttons, sensors, features, etc. may also be included but are not shown to avoid excessive clutter in the drawing. Within the context of this document, 'hard' buttons are so called because they are physical buttons, permanently located in specific areas. But the device may also contain 'soft' buttons, each consisting of an image on the touch-sensitive display screen, denoted herein as a touchscreen. When the user touches a soft button, the device may sense that touch and perform whatever function is associated with that soft button. The term 'key' is used in this document to denote a soft button that represents an individual key on a virtual keyboard shown on the touchscreen.

Although the illustrated device 110 is depicted as having a particular shape, proportion, and appearance, with buttons located in particular locations, this is for example only and the embodiments of the invention may not be limited to this particular physical configuration. For example, in some embodiments various features may be located elsewhere on the same side or on different sides of the device. In some embodiments the overall shape of the device 110 may be different than shown.

Device 110 may also include functionality for wireless communication, for various visual, audio, and physical inputs, and for various visual, audio, and physical outputs that are not specifically described herein. In some embodiments, the device may use this functionality in different ways depending on which mode it is in.

Virtual Keyboard with Tiered Arcs

FIG. 1 also shows a virtual keyboard on the touchscreen display. In a virtual keyboard, each key on the keyboard is implemented as a soft button on the touchscreen. When the user touches a particular key with his/her thumb (or finger, or stylus, or other object), the device 110 senses that touch, determines where on the screen the touch occurred, determines which key is associated with that location, and interprets this touch as a keystroke of the selected key. In some embodiments, a hysteresis effect may be used in which the user must remove his finger from the key for a minimum amount of time and touch the key again before a second touch of that key will be registered.

In this example, the keys on the keyboard are arranged in three rows that each follow an arc shape. These rows are positioned for ease of reach by the user's thumb. Because of the configuration of the human thumb, the arcs may not be perfectly circular, but rather each arc might have a variable rate of curvature. For this reason, the terms 'circular' and 'concentric' are not used to describe them here, although in some instances the arcs might be circular and/or concentric. These arcs are described herein as 'tiered' arcs because each arc has a pivot point (the pivot point of the user's thumb) that is in approximately the same place, and each arc has a similar shape, with each arc being approximately the same distance from the next adjacent arc throughout the length of those arcs, when measured radially from the pivot point. Ease of reach by the user's thumb, rather than a rigid geographical shape, may be the guiding principle when determining the curvature and location of each arc.

The example of FIG. 1 shows three rows of keys, but other embodiments may have one, two, four, or more rows. The keys are shown the same size in all rows, but in some embodiments, some keys may be larger or smaller than others. For example, the inner row may have smaller keys than the outer row. Not only does this allow more keys to be placed on the inner row, which has less room for keys, but it also recognizes that the user is likely to touch keys on the inner row with the end of his thumb, which presents a smaller touch area than is felt by keys on the outer row, which are touched with the thumb in an extended position.

The illustrated example also shows that the three rows are spaced the same distance from each other, but other embodiments may differ. Again, the mechanics and flexibility of the human thumb may determine this spacing.

Each key is shown with a somewhat rectangular shape, but the soft keys may be displayed with any convenient shape. In some embodiments, different keys may have different shapes to provide addition information to the user (for example, a square shape for upper case, and a round shape for lower case). Different colors may also be used to denote additional information about that key. Each key is shown labeled with the character it represents. These labels are all shown oriented with respect to the bottom of the device (for easy reading by the user) but other embodiments may orient the label with respect to the radial center of the arcs, or some other definable reference point. In some embodiments, the displayed character will be shown as upper-or lower-case to indicate whether the upper-or lower-case version of the character is represented by that key.

In some embodiments, whenever a key touch is registered by the device, the symbol represented by the key will be shown in an enlarged version to provide positive feedback to the user, and the position of this enlarged key may be shifted so that it won't be obscured by the user's thumb. In the example of FIG. 1, the user touches the 'M'key (which is hidden from view by the user's thumb), and an enlarged version of the 'M'key is shown just beyond the user's thumb, temporarily overlaying whatever other keys are located there. Different color, style, shape, etc. may also be used to distinguish this touch indicator from the remainder of the keys.

The example of FIG. 1 shows particular characters assigned to particular key positions, but this is for example only. Other embodiments may assign characters to key positions in any desirable arrangement, such as QWERTY, Dvorak, etc. In some embodiments, the key assignments may be programmable.

Because the configuration shown in FIG. 1 is designed for one-handed operation, and the keyboard is therefore limited to the space reachable by a single thumb, there may not be enough space to simultaneously represent all the characters that he user wants to type. To compensate for this, all or a portion of the key positions may be reassigned to represent other characters, and new labels representing the new characters may be produced on the touchscreen for those keys. This change may be initiated in any convenient manner, such as but not limited to: 1) touching one of the keyboard keys assigned to this function, 2) touching a particular soft key outside the keyboard area, 3) pressing a hard button, 4) dragging the thumb along a substantial part of an arc, 5) etc.

In some embodiments, the full available keyboard may be thought of as an approximate wheel with four quadrants, with each quadrant having a separate set of characters, and with only one quadrant visible on the touch screen at a time (or two quadrants visible for the two-handed operation described later). The user may then call up whichever quadrant he wants displayed. For example, one quadrant might contain keys with letters, another quadrant contain keys with numbers and punctuation marks, another quadrant contain keys representing pictures, icons, letterheads, etc., that the user likes to insert into documents, and the fourth quadrant contain commonly used phrases, sentences, paragraphs, etc. Of course, more or fewer than four quadrants may also be used, since this is a virtual concept and is not constrained to an actual physical circle.

The keyboard configuration shown in FIG. 1 is designed for right-handed operation by making the rows of keys concentric about the lower right-hand corner. By making the rows of keys concentric about the lower left hand corner, the device may be suitable for left-handed operation. The illustrated keyboard is also shown configured for vertical operation, i.e., the long side of the display is vertical. Some embodiments may operate with a horizontal operation, i.e., the long side of the display is horizontal. In some embodiments, the right/left handed configuration and/or the vertical/horizontal operation is selectable by the user. In some embodiments, these configurations may be automatically selected by the device (e.g., sensing gravity to select the vertical/horizontal operation, and sensing which part of the display is touched by the user's thumb to select right- or left-handed operation).

Figure 2:
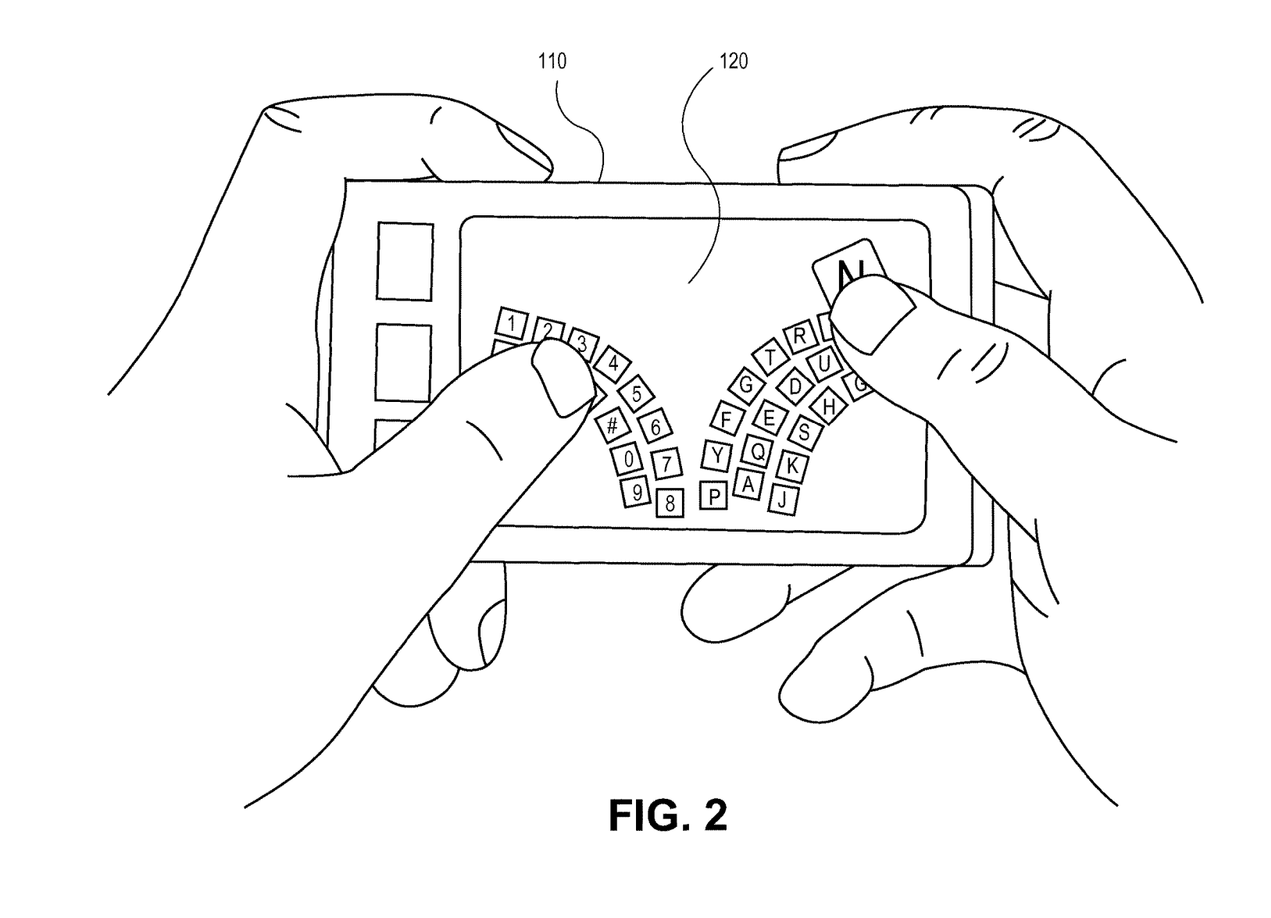
FIG. 2 shows a virtual keyboard configured for two-handed operation, according to an embodiment of the invention.

FIG. 2 shows a virtual keyboard configured for two-handed operation, according to an embodiment of the invention. The primary difference between this two-handed operation and the one-handed operation of FIG. 1 is that there are two portions to the virtual keyboard, one configured for operation with the right thumb and the other configured for operation with the left thumb. More keys, and therefore more characters, can be simultaneously displayed with this configuration, as compared with the one-handed configuration of FIG. 1. The two keyboard portions may have the same or a different number of rows, the same or a different number of keys in each row, different spacing, etc. In some embodiments, the assignment of characters to the individual keys may be switched between the left and right areas for the convenience of users that have a left- or right-handed preference. All the same features, techniques, choices, etc. that are available for one-handed operation may also be applied to this two handed operation, and in some embodiments may be applied separately for each portion of the keyboard. In some embodiments the user may manually select either one- or two-handed operation. In some embodiments, the device may automatically select one- or two-handed operation, based on some automatically sensed criteria, such as device orientation or sensing touches on both sides of the touchscreen.

Figure 3:
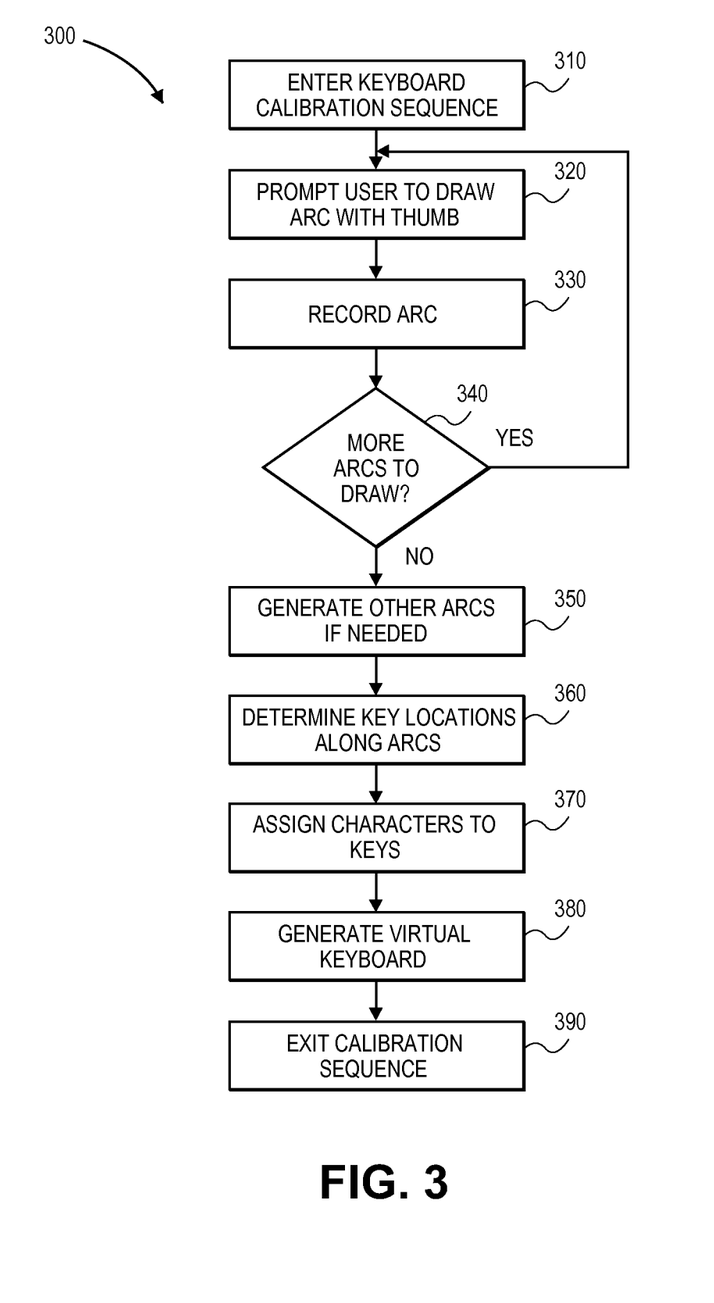
FIG. 3 shows a flow diagram of a method of calibrating the size of the keyboard to the individual user, according to an embodiment of the invention.

FIG. 3 shows a flow diagram of a method of calibrating the size of the keyboard to the individual user, according to an embodiment of the invention. In flow diagram 300, at 310 the calibration process may be initiated by the user, or started automatically based on some pre-determined criteria, such as but not limited to: a) powerup of the device, b) creation of a new user account, c) changing the font size of the characters on the virtual keyboard, d) etc. The user may then be prompted at 320 to draw an arc with his thumb on the touchscreen surface, with his hand in its normal data-entry position. This arc may be referred to as a 'calibration arc' because its purpose is to calibrate the location of a keyboard row so the keys on that row will be at a convenient position for the user's thumb. In some embodiments, this arc will be visible on the touchscreen after being drawn by the user, but other embodiments may not display the calibration arc.

In either case, the location of this arc on the display screen may be recorded at 330. This location may be used to determine where the corresponding row of keys will be placed on the screen. In some embodiments, the user may be prompted to enter more than one arc. For example, to calibrate the device for two-handed keyboard operation, the user may be prompted to draw separate arcs, one with each thumb. If more than one row is to be calibrated, the user may be prompted to draw a middle arc, an outer arc, and/or an inner arc. In some embodiments, the user may be prompted to retrace the same arc more than once, so the device can determine an average position for that arc. Any or all of these options may be accommodated with the operations at 320-330-340.

In some embodiments, the arc for only one row of keys is input by the user's thumb, and the other arcs for the other rows for that thumb are automatically located with respect to that arc. In such a case, the locations of the other arcs are determined at 350. In one embodiment, the user may have been prompted to draw an arc with the thumb in a mid-position, neither fully extended nor fully retracted, and the other rows placed in larger and smaller arcs with respect to that one. In another embodiment the user may draw an arc with the thumb fully extended to mark the location of the outer row of keys, with the other arcs created inside that one. Conversely, the user may draw an arc with the thumb fully retracted to mark the location of the inner row of keys, with the other arcs created outside that one.

Once the arc locations have been determined, at 360 the device may assign the position of each key along each arc, with each arc representing a row of keys. In some embodiments, a predetermined spacing between adjacent keys on the same row may be assumed. In other embodiments, the spacing may vary. For example, if the calibration process was able to determine the width of the user's thumbprint in various locations, this information may be used to decide the space between keys. A wide thumb print may lead to a wider spacing between keys, to reduce the chance of touching multiple keys in a manner that could lead to error.

At 370, the various characters (letters, numerals, punctuation marks, etc.) may be assigned to the various key positions on the different rows. In some embodiments, this arrangement may be predetermined. In other embodiments, this arrangement may be customized, based on various criteria. For example, the most frequently used characters may be placed on the middle row, to reduce thumb travel. The next most frequently used characters may be placed on the outer row, since extending the thumb is generally considered easier than retracting the thumb. Commonly occurring sequences of characters (e.g., digraphs) can be ordered sequentially along an arc to facilitate a more natural 'inward sweep' motion of the thumb. For two-handed operation, commonly occurring sequences can be alternated between the two thumbs to facilitate alternating thumb action. Other considerations may also be used to assign characters to key positions. In some embodiments, the user may be able to assign characters to specific key positions. At 380, the device may generate the completed keyboard on the display based on these character position assignments, and exit the calibration sequence at 390. By virtue of these and other features, various embodiments of the invention may provide a virtual keyboard that is well suited to the natural motion of the user's thumb(s) and is customized to characteristics and preferences of the user. The invention may thereby improve the ease, speed, and accuracy with which the user can enter text on the device.

Due to the close spacing of the keys, and the relatively large contact area of the user's thumb, it is likely that the user will frequently contact more than one key simultaneously. Various approaches may be taken to reduce the negative effects of this by interpreting which key the user intended to touch. Some approaches involve interpreting the area contacted by the user's thumb, while others are based on context and repetitive errors. Both approaches are described below.

Contact Patch Adjustments

The 'contact patch' is the area in which the user contacts the touchscreen when attempting to touch a key or other icon. If a stylus is used, the contact patch may be very small and well-defined in shape. If the user's fingertip is the instrument of contact, the contact patch may be somewhat larger, and the size may vary depending on the pressure which the user applies with that finger. The size and shape of the contact patch may both vary depending on the angle with which the finger contacts the touchscreen. If the thumb is used as the instrument of contact, the same considerations apply, but the size is likely to be even larger than with the fingertip, due to the thumb's generally greater cross section, and the shape and size may vary considerably depending on the contact angle of the thumb, which may generally be shallower than the contact angle of a finger.

Since the contact patch may be even larger than the key on the touchscreen that is being touched, the sensing device may have to interpret the sensor information and determine a point at which the touch was intended. Within this document, this point is called the 'active point', which may or may not be the centroid (the geographical center) of the contact patch. These calculations may be complicated by the fact that the size and shape of the contact patch varies with: 1) which row the key is on (which affect the angle of the thumb), and 2) whether the user is entering data with a one-handed or two-handed keyboard operation (the position of the hand, and therefore the angle of the thumb, may generally be different in a two-handed operation than it is in a one-handed operation). Further, the actual contact patch and/or the actual centroid of that contact patch may be different than the contact patch and centroid as perceived by the user.

In some embodiments the device may assume that a particular row of keys will experience an elliptical contact patch with the ellipse oriented in a particular direction, while a different row of keys may experience an elliptical contact patch with the ellipse oriented in a different direction, or even a circular contact patch. These assumptions may be taken into consideration when calculating the active point. Assumptions made about a contact patch for a middle row may be interpolated between assumptions made about contact patches for the inner and outer rows. These are only examples; the actual assumptions may vary from this based on actual experience with the user and/or previous studies based on the general population.

As an example of user perception, for some rows the user may perceive the active point to be near the end of the thumb tip, and the device may move the active point away from the centroid to accommodate this perception.

Since the angle of the thumb, and therefore the shape of the contact patch, is generally different during two-handed operation than during one-handed operation, the device may sense which mode of operation is being currently used, and adjust the active point calculations accordingly. For example, the device may assume a two-handed operation is being used if a two-handed keyboard is displayed on the touchscreen. Or the device may infer the same by sensing contact in both parts of the screen. In another embodiment, the device may assume one-handed operation if the device is being held in a vertical orientation (the short dimension is horizontal), and two-handed operation if the device is being held in a horizontal orientation (the long dimension is horizontal), based on accelerometers or other sensors. However, the user may be able to manually override these assumptions if desired.

In some embodiments, the type of instrument being used to contact the screen may be inferred by the device based on the size and shape of the contact patch. If the contact patch is relatively large, the device may assume the thumb is being used and adjust the active point accordingly. If the contact patch is smaller, the device may assume that a finger is being used, and adjust the active point based on that assumption. If the contact patch is very small, the device may assume a stylus is being used, and not make any adjustments.

Regardless of the type of adjustments being made, in some embodiments these adjustments may be pre-defined, either based on a standard set of parameters, or based on the results of one or more calibration sessions. In other embodiments, the adjustments may be continually or frequently modified, based on the recent history of operation. In some embodiments, both initial calibration and ongoing adjustments may be incorporated.

Figure 4:
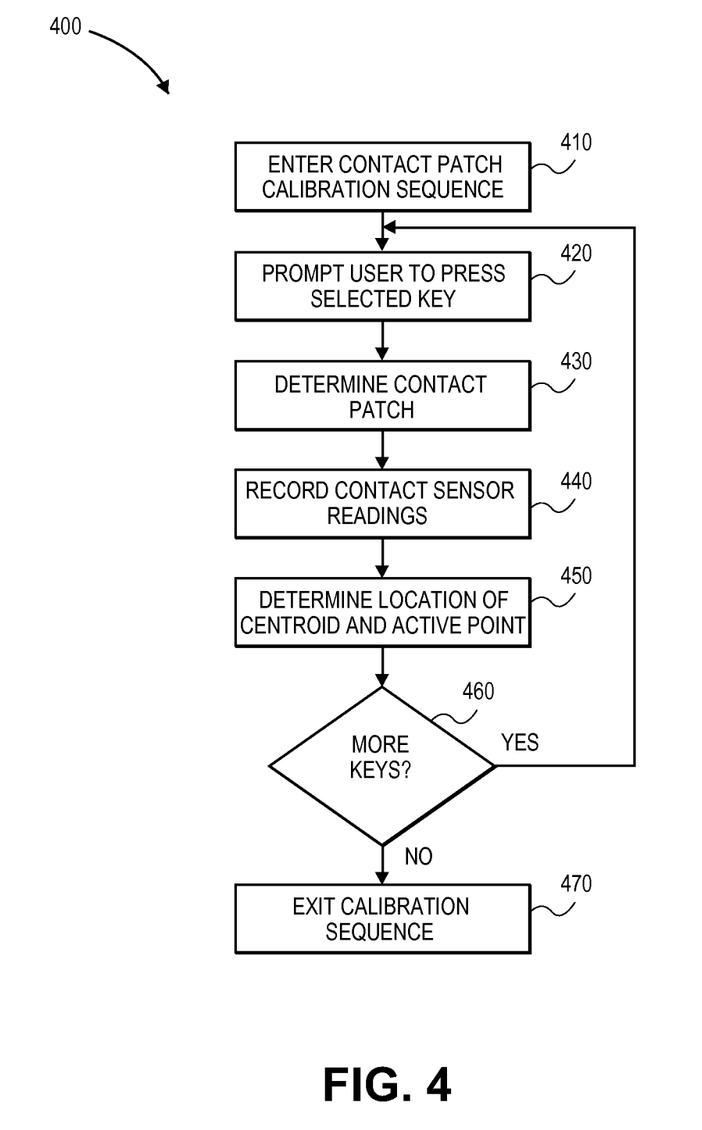
FIG. 4 shows a flow diagram of a method for an initial contact patch calibration sequence, according to an embodiment of the invention.

FIG. 4 shows a flow diagram of a method for a contact patch calibration sequence, according to an embodiment of the invention. The method of flow diagram 400 may be used to pre-calibrate the device to a particular user's characteristics. Operations 430-460 may also be used for ongoing adjustments during normal operation of the virtual keyboard. After entering the contact patch calibration sequence at 410, at 420 the device may prompt the user to press a selected key. In some embodiments, the keyboard (e.g., the keyboard generated by the keyboard calibration sequence of FIG. 3) may be fully displayed, but in other embodiments the key may be shown in isolation in the same location it will occupy in that keyboard.

When the user touches the selected key, the device determines relevant information on the contact patch at 430. Based on readings from the individual contact sensors in the touchscreen, the device may determine the size and shape of the contact patch, and in some embodiments may record the contact readings for the different areas of the contact patch at 440. At 450 the device may determine the centroid for the contact patch, i.e., the geometric center of the contact patch. In some procedures, the centroid may be considered the initial active point for the contact patch, but may then be relocated based on other factors, such as those previously described. In some embodiments, the touchscreen may provide the device with only a calculated centroid position for the contact patch, rather than providing multiple contact sensor readings and having the device calculate the centroid.

At 460, the device may then return to 420 to calibrate the contact patch for another key on the keyboard. In some embodiments this process may be repeated for every key on the keyboard. In other embodiments, only some keys or touchscreen locations may be used in this calibration procedure, and calibration data for the rest may be interpolated from the results of those keys. In some embodiments, the same key may be calibrated more than once, to obtain an average of the readings for that key. After all the selected keys or areas of the touchscreen have been calibrated, either directly or through interpolation, the calibration sequence may be exited at 470.

Keyboard Adaptation

When more than one key is simultaneously touched by the user, the device may use various techniques to determine which key the user intended to touch. Some techniques are contextual in nature, and may not be performed immediately. For example, the device may compare the multiple contacted characters to the rest of the word to determine which character forms a real word, based on a spelling dictionary. If more than one of the possible characters forms a real word, the context of the sentence may be examined to select which word was most likely intended, and therefore which character was intended.

In some cases, there may be a previous history of striking this same combination of adjacent keys, when a particular one of those keys was usually intended, and this history may be taken into account.

If the touchscreen provides local pressure measurements, the key receiving the highest pressure from the thumb may be assumed to be the intended key. Alternately, the different pressure measurements for the different contacted keys may be multiplied by a probability factor, based on predictive text analysis, to determine which key was most likely intended.

The 'hot spot', i.e., the spot that the device considers the center of a key, may be shifted if the user consistently misses the hot spot in the same direction. For example, if the user consistently types below the hot spot of the 's' key, the device may move the hot spot of the 's' key downward. Determining that the user consistently misses in the same direction may be determined in various ways. For example, localized pressure sensing at various points in the contact patch may be used to determine that the highest pressure point in the contact patch consistently misses the center of the key in the same direction. In another example, it may be determined that the centroid or active point consistently misses the key or its hotspot in the same direction.

In another example, words with that particular character may be frequently misspelled by substituting the same adjacent character. This may be verified, for example, when the user either manually corrects such misspellings, and/or when the user accepts automatic spelling corrections. In some embodiments, the displayed position of the key may remain unchanged, even though the hotspot for that key is relocated. In other embodiments, the displayed position of the key may be moved so that the new hotspot is centered within the displayed key. In some embodiments, the device may attempt to differentiate between simply typing the wrong character (e.g., none of the contacted characters spell a word, or maybe dyslexic letter inversion frequently occurs), and errors due to missing the hotspot, and adjust the hotspot only in response to the latter.

Figure 5:
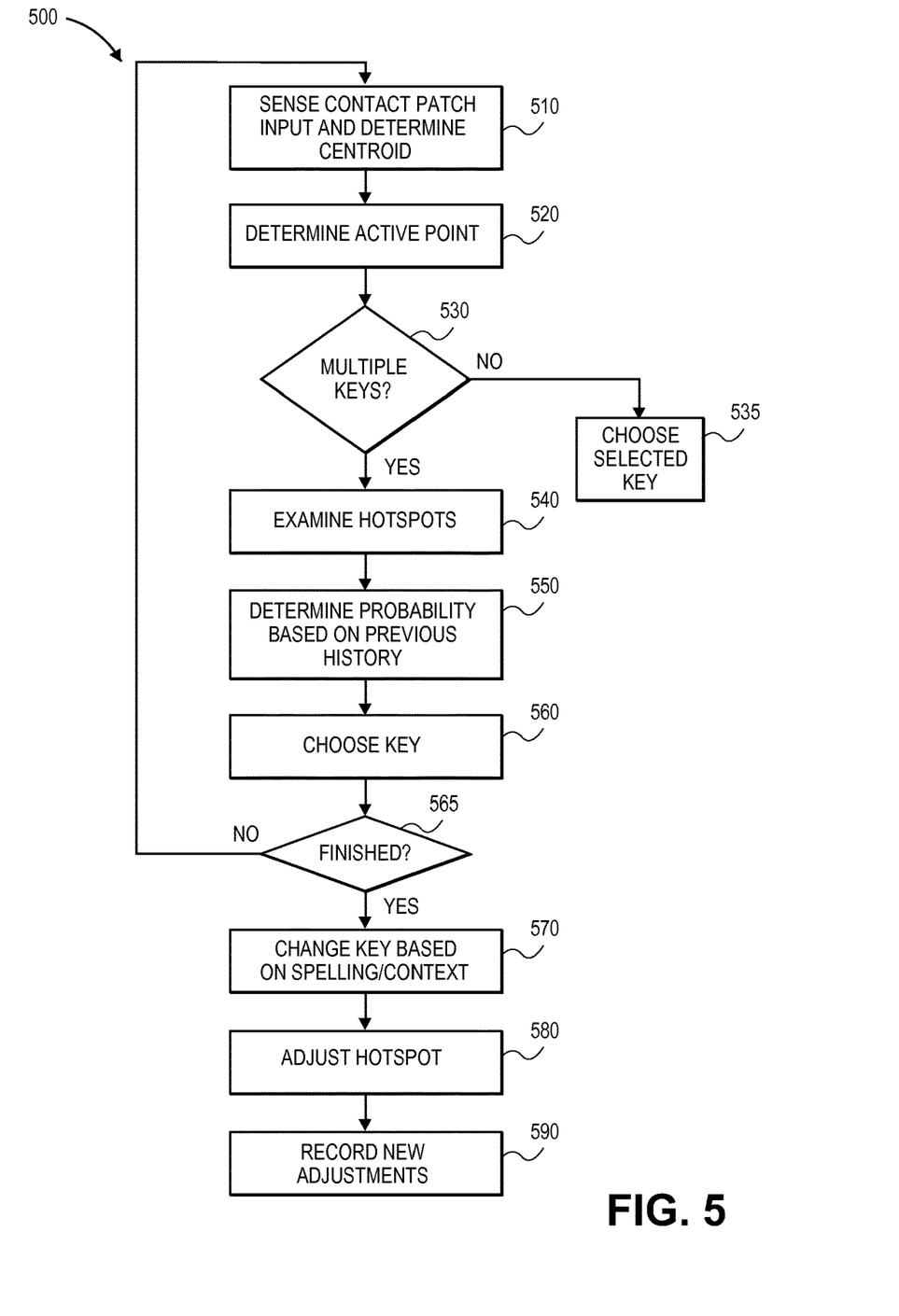
FIG. 5 shows a flow diagram of a method of adaptively interpreting keystrokes, according to an embodiment of the invention.

FIG. 5 shows a flow diagram for a method of adaptively interpreting keystrokes, according to an embodiment of the invention. In flow diagram 500, at 510 the device may receive input from the touchscreen indicating a key has been touched, and determine the centroid of the contact patch. In some embodiments this input may comprise readings from multiple contact sensors that define the contact patch, which may then be converted to the location of the centroid. In other embodiments, the input from the touchscreen may simply represent the location of the centroid, as determined by the touchscreen logic.

In either case, the active point may be determined at 520 based on the location of the centroid and on previously determined differences between the centroid and active point for that part of the touchscreen. If the intended key is obvious based on the location of the active point, at 535 the device may assume that key was intended. However, if the active point is sufficiently close to multiple keys to cause uncertainty as to which key was intended, as determined at 530, the device may examine the hotspots of those multiple keys at 540. At 550, the device may determine the probability that each of these keys represents the correct key, based on various criteria. A significant criteria may be the previous history with this same grouping of keys.

Based on these and other considerations, at 560 the device may select which key was most likely intended by the user, and enter that character into the typing sequence. At this point it may not be feasible to look at spelling and context considerations for that particular keystroke because the rest of the word or sentence has not been completed. The device may then return to 530 to process more keystrokes. At each pass through 565, the device may determine if it is finished with spelling/context considerations for that particular keystroke. If it is, it may possibly change the previously chosen key at 570 based on those factors.

Once the chosen character and associated key have been finalized, the lessons learned from this process may be incorporated for future processing. For example, at 580 the location of the hotspot for that key may be adjusted. This information may be recorded for future use at 590.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus comprising:
   a handheld electronic device having a touchscreen for displaying a virtual keyboard having three arc-shaped tiered rows of keys, including keys associated with respective characters, wherein the device is configured to:
   enable a user to enter text content via the virtual keyboard with one hand while holding the handheld electronic device in the same hand; and
   perform predictive text analysis to determine characters intended to be entered by the user as the user enters the text content via the virtual keyboard, wherein to perform predictive text analysis the device is further configured to,
   in response to a user selection of a key that is part of a word in a sentence being entered by the user via the virtual keyboard,
   compare characters for each of one or more adjacent keys proximate to a sensed input coordinate to a remaining portion of the word to determine whether using the character forms a real word; and
   if more than one of the characters that are compared forms a real word, examine a context of a sentence that would be formed using that word to select which word and character was most likely intended.

2. The apparatus of claim 1, wherein the apparatus is configured to determine a key intended to be selected by the user based, in part, on a history of previous determinations of intended key selections.

3. The apparatus of claim 1, wherein the apparatus is configured to:
   in response to a user selection of a key that is part of a word in a sentence being entered by the user via the virtual keyboard,
   sense an area of the touchscreen a user's finger or thumb is in contact with corresponding to the key selection,
   detect that the user intended to select one of multiple adjacent keys proximate to the area of the touchscreen that is sensed; and
   determine a key intended to be selected by the user based on at least one of the area of the touchscreen that the user's finger or thumb is sensed to be in contact with and an active point detected via the touchscreen or determined as a function of the area; and
   predictive text analysis that considers at least one of a context of the word and a context of the sentence.

4. The apparatus of claim 1, wherein the apparatus is configured to adapt active points relative to areas of the touchscreen that the user's finger or thumb are sensed to be in contact with based on observation of intended keys over time.

5. The apparatus of claim 1, wherein the three arc-shaped tiered rows of keys are arranged to be selectively activated via a user's thumb, and wherein the apparatus is configured to determine what key is selected is based on detecting areas of the touchscreen the user's thumb is sensed to be in contact with corresponding to the key selection.

6. The apparatus of claim 1, wherein the three arc-shaped tiered rows of keys are arranged to be selectively activated via a user's thumb when the user is holding the apparatus using one hand including the user's thumb.

7. The apparatus of claim 1, wherein the apparatus is configured to enable a user to adjust a layout of the keyboard.

8. The apparatus of claim 1, wherein the apparatus is configured to:
detect whether a user is selecting keys using a finger or using a thumb; and adjust a
location of an active point relative to a detected area of the touchscreen display that the user's finger or thumb is sensed to be in contact with based on whether use of a finger or thumb for selecting keys is detected.

9. A method for implementing a virtual keyboard on a handheld electronic device having a touchscreen for displaying the virtual keyboard, the method comprising:
displaying three arc-shaped tiered rows of keys on the touchscreen display;
in response to a user selection of a key that is part of a word in a sentence being entered by the user via the virtual keyboard,
sensing an area of the touchscreen a user's finger or thumb is in contact with corresponding to the key selection,
detecting that the user intended to select one of multiple adjacent keys proximate to the area of the touchscreen that is sensed; and
determining a key intended to be selected by the user based on at least one of the area of the touchscreen that the user's finger or thumb is sensed to be in contact with and an active point detected via the touchscreen or determined as a function of the area;
performing predictive text analysis including,
comparing characters for each of the multiple adjacent keys to a remaining portion of the word to determine whether using the character in forms a real word; and
if more than one of the characters that are compared forms a real word, examining a context of a sentence that would be formed using that word to select which word and character was most likely intended.

10. The method of claim 9, wherein determining a key intended to be selected by the user further includes considering a history of previous determinations of intended key selections.

11. The method of claim 9, further comprising adapting active points relative to contact patches based on observation of intended keys over time.

12. The method of claim 9, wherein the three arc-shaped tiered rows of keys are arranged to be selectively activated via a user's thumb, further comprising implementing logic to determine what key is selected by detecting areas of the touchscreen the user's thumb is sensed to be in contact with corresponding to the key selection.

13. The method of claim 9, wherein the three arc-shaped tiered rows of keys are arranged to be selectively activated via a user's thumb when the user is holding the apparatus using one hand including the user's thumb.

14. The method of claim 9, further comprising enabling a user to adjust a layout of the keyboard.

15. The method of claim 9, further comprising:
detecting whether a user is selecting keys using a finger or using a thumb; and
adjusting a location of an active point relative to a detected area of the touchscreen display that the user's finger or thumb is sensed to be in contact with based on whether use of a finger or thumb for selecting keys is detected.

16. A non-transitory machine-readable medium having instructions stored thereon configured to be executed on a processor of a handheld electronic device having a touchscreen display to implement a virtual keyboard on the touchscreen display, wherein execution of the instructions enables the handheld electronic device to:
display three arc-shaped tiered rows of keys on the touchscreen display;
in response to a user selection of a key that is part of a word in a sentence being entered by the user via the virtual keyboard,
sense an area of the touchscreen a user's finger or thumb is in contact with corresponding to the key selection,
detect that the user intended to select one of multiple adjacent keys proximate to the area of the touchscreen that is sensed;
determine a key intended to be selected by the user based on at least one of the area of the touchscreen that the user's finger or thumb is sensed to be in contact with and an active point detected via the touchscreen or determined as a function of the area; and
perform predictive text analysis including,
comparing characters for each of the multiple adjacent keys to a remaining portion of the word to determine whether using the character in forms a real word; and
if more than one of the characters that are compared forms a real word, examining a context of a sentence that would be formed using that word to select which word and character was most likely intended.

17. The non-transitory machine-readable medium of claim 16, wherein determining a key intended to be selected by the user further includes tracking a history of previous determinations of intended key selections.

18. The non-transitory machine-readable medium of claim 16, wherein execution of the instructions further enables the handheld electronic device to adapt active points relative to areas of the touchscreen display that the user's finger or thumb is sensed to be in contact with based on observation of intended keys over time.

19. The non-transitory machine-readable medium of claim 16, wherein the three arc- shaped tiered rows of keys are arranged to be selectively activated via a user's thumb, wherein execution of the instructions further enables the handheld electronic device to determine what key is intended to be selected based on a detection of contact patches formed using a user's thumb.

20. The non-transitory machine-readable medium of claim 16, wherein the three arc- shaped tiered rows of keys are arranged to be selectively activated via a user's thumb when the user is holding the apparatus using one hand including the user's thumb.

21. The non-transitory machine-readable medium of claim 16, wherein execution of the instructions further enables the handheld electronic device to adjust a layout of the keyboard in response to user input.

22. The non-transitory machine-readable medium of claim 16, wherein execution of the instructions further enables the handheld electronic device to:
- detect whether a user is selecting keys using a finger or using a thumb; and adjust a
- location of an active point relative to a detected area of the touchscreen display that the user's finger or thumb is sensed to be in contact with based on whether use of a finger or thumb for selecting keys is detected.

* * * * *